(12) United States Patent
Sato

(10) Patent No.: US 12,256,049 B2
(45) Date of Patent: Mar. 18, 2025

(54) NON-TRANSITORY COMPUTER-READABLE RECORDING MEDIUM STORING COMPUTER-READABLE INSTRUCTIONS FOR TERMINAL DEVICE AND METHOD FOR CONTROLLING TERMINAL DEVICE

(71) Applicant: BROTHER KOGYO KABUSHIKI KAISHA, Nagoya (JP)

(72) Inventor: Hirotaka Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/393,005

(22) Filed: Dec. 21, 2023

(65) Prior Publication Data

US 2024/0214503 A1 Jun. 27, 2024

(30) Foreign Application Priority Data

Dec. 27, 2022 (JP) .................. 2022-210735

(51) Int. Cl.
H04N 1/34 (2006.01)
G06F 3/12 (2006.01)

(52) U.S. Cl.
CPC .......... *H04N 1/346* (2013.01); *G06F 3/1218* (2013.01); *G06F 3/1231* (2013.01)

(58) Field of Classification Search
CPC ...... H04N 1/346; G06F 3/1218; G06F 3/1231
USPC ....................................... 358/1.15
See application file for complete search history.

(56) References Cited

U.S. PATENT DOCUMENTS

| 2015/0181060 A1* | 6/2015 | Miyazawa | H04N 1/00411 |
| | | | 358/1.15 |
| 2015/0205558 A1* | 7/2015 | Oike | G06F 3/048 |
| | | | 358/1.15 |
| 2017/0078502 A1* | 3/2017 | Subana | H04N 1/00344 |
| 2018/0131573 A1 | 5/2018 | Matsuda | |

FOREIGN PATENT DOCUMENTS

| JP | 2013-161469 A | 8/2013 |
| JP | 2018-077623 A | 5/2018 |

* cited by examiner

Primary Examiner — Allen H Nguyen
(74) Attorney, Agent, or Firm — KENEALY VAIDYA LLP

(57) ABSTRACT

A terminal device displays a selection screen on a display unit of the terminal device for selecting target identification information, the target identification information being for identifying a target printing device which is to execute printing. The selection screen includes M identification information (M being equal to or greater than 1) for identifying M printing devices and N identification information (N being equal to or greater than 1) for identifying N printing devices. Each of the M printing devices is a printing device for which registration of a printing-related predetermined service has been completed, each of the N printing devices is a printing device for which registration of the printing-related predetermined service has not been completed, each of the M identification information has a first display manner, and each of the N identification information has a second display manner different from the first display manner.

20 Claims, 4 Drawing Sheets

FIG. 4
(Second Embodiment)
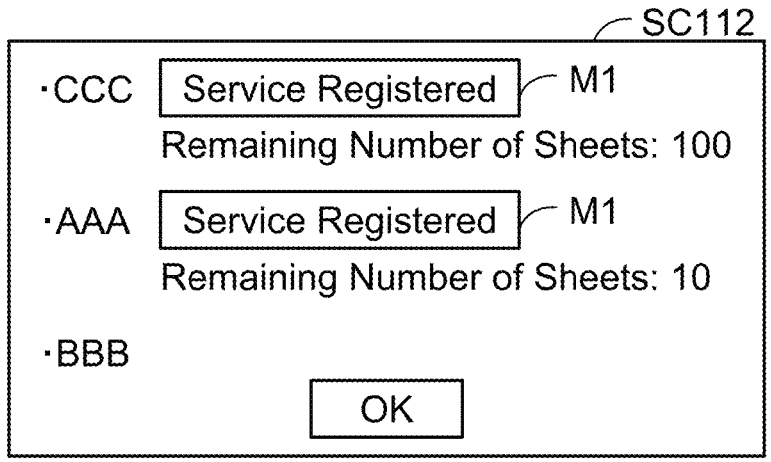
(Third Embodiment)
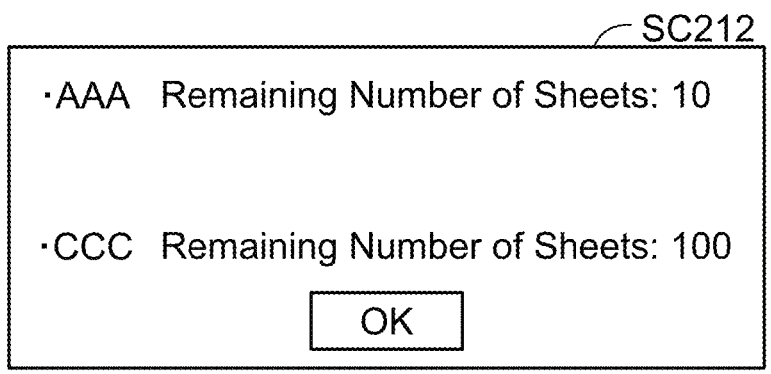
(Fourth Embodiment)
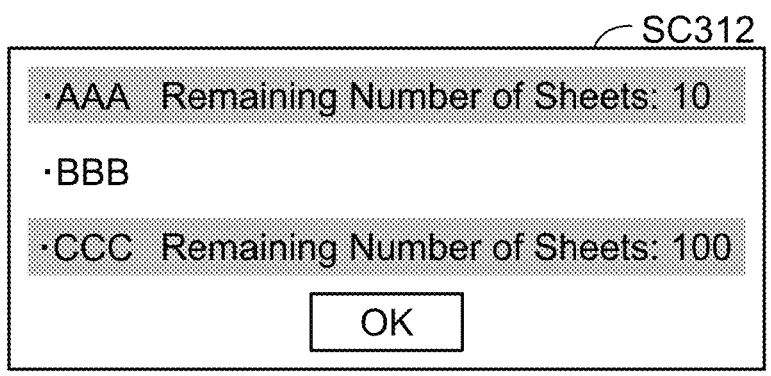
(Fifth Embodiment)
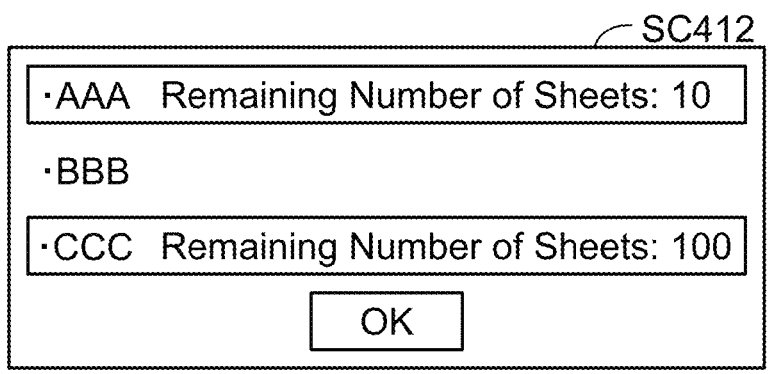

NON-TRANSITORY COMPUTER-READABLE RECORDING MEDIUM STORING COMPUTER-READABLE INSTRUCTIONS FOR TERMINAL DEVICE AND METHOD FOR CONTROLLING TERMINAL DEVICE

REFERENCE TO RELATED APPLICATION

This application claims priority from Japanese Patent Application No. 2022-210735 filed on Dec. 27, 2022. The entire content of the priority application is incorporated herein by reference.

BACKGROUND ART

An art configured to display a list of printing device(s) capable of communicating with a mobile terminal is known.

DESCRIPTION

The present teachings provide a technique configured to improve user convenience.

A non-transitory computer-readable recording medium storing computer-readable instructions for a terminal device is disclosed herein. The computer-readable instructions, when executed by a processor of the terminal device, may cause the terminal device to: display a selection screen on a display unit of the terminal device, the selection screen being for selecting target identification information from among one or more pieces of identification information for identifying one or more printing devices, and the target identification information being for identifying a target printing device which is to execute printing; and in a case where the target identification information is selected via the selection screen, send a print executing instruction to the target printing device identified by the target identification information. The selection screen may include M pieces of identification information for identifying M printing devices of the one or more printing devices and N pieces of identification information for identifying N printing devices of the one or more printing devices, the M being an integer equal to or greater than 1 and the N being an integer equal to or greater than 1. Each of the M printing devices may be a printing device for which registration of a predetermined service related to printing has been completed, each of the N printing devices may be a printing device for which registration of the predetermined service has not been completed, each of the M pieces of identification information may have a first display manner, and each of the N pieces of identification information may have a second display manner different from the first display manner.

According to the above configuration, on the selection screen, each of the M piece(s) of identification information for identifying the M printing device(s) for which the registration of the predetermined service has been completed has the first display manner while each of the N piece(s) of identification information for identifying the N printing device(s) for which the registration of the predetermined service has not been completed has the second display manner. Due to this, the printing device(s) for which the registration of the predetermined service has been completed can be easily recognized. Due to this, user convenience can be improved.

Another non-transitory computer-readable recording medium storing computer-readable instructions for a terminal device is also disclosed herein. The computer-readable instructions, when executed by a processor of the terminal device, may cause the terminal device to: display a selection screen on a display unit of the terminal device, the selection screen being for selecting target identification information from among one or more pieces of identification information for identifying one or more printing devices, and the target identification information being for identifying a target printing device which is to execute printing; and in a case where the target identification information is selected via the selection screen, send a print executing instruction to the target printing device identified by the target identification information. On the selection screen, M pieces of identification information for identifying M printing devices of the one or more printing devices may be displayed with priority over N pieces of identification information for identifying N printing devices of the one or more printing devices, the M being an integer equal to or greater than 1 and the N being an integer equal to or greater than 1. Each of the M printing devices may be a printing device for which registration of a predetermined service related to printing has been completed, and each of the N printing devices may be a printing device for which registration of the predetermined service has not been completed.

According to the above configuration, the M piece(s) of identification information for identifying the M printing device(s) for which the registration of the predetermined service has been completed are displayed with priority over the N piece(s) of identification information for identifying the N printing device(s) for which the registration of the predetermined service has not been completed. Due to this, the user can easily recognize the printing device(s) for which the registration of the predetermined service has been completed. Due to this, user convenience can be improved.

Computer program for the terminal device, a method for controlling the terminal device and the terminal device itself realized by the above-described computer-readable instructions are also novel and useful.

FIG. 4 illustrates printer selection screens in respective embodiments.

First Embodiment

Figure 1:
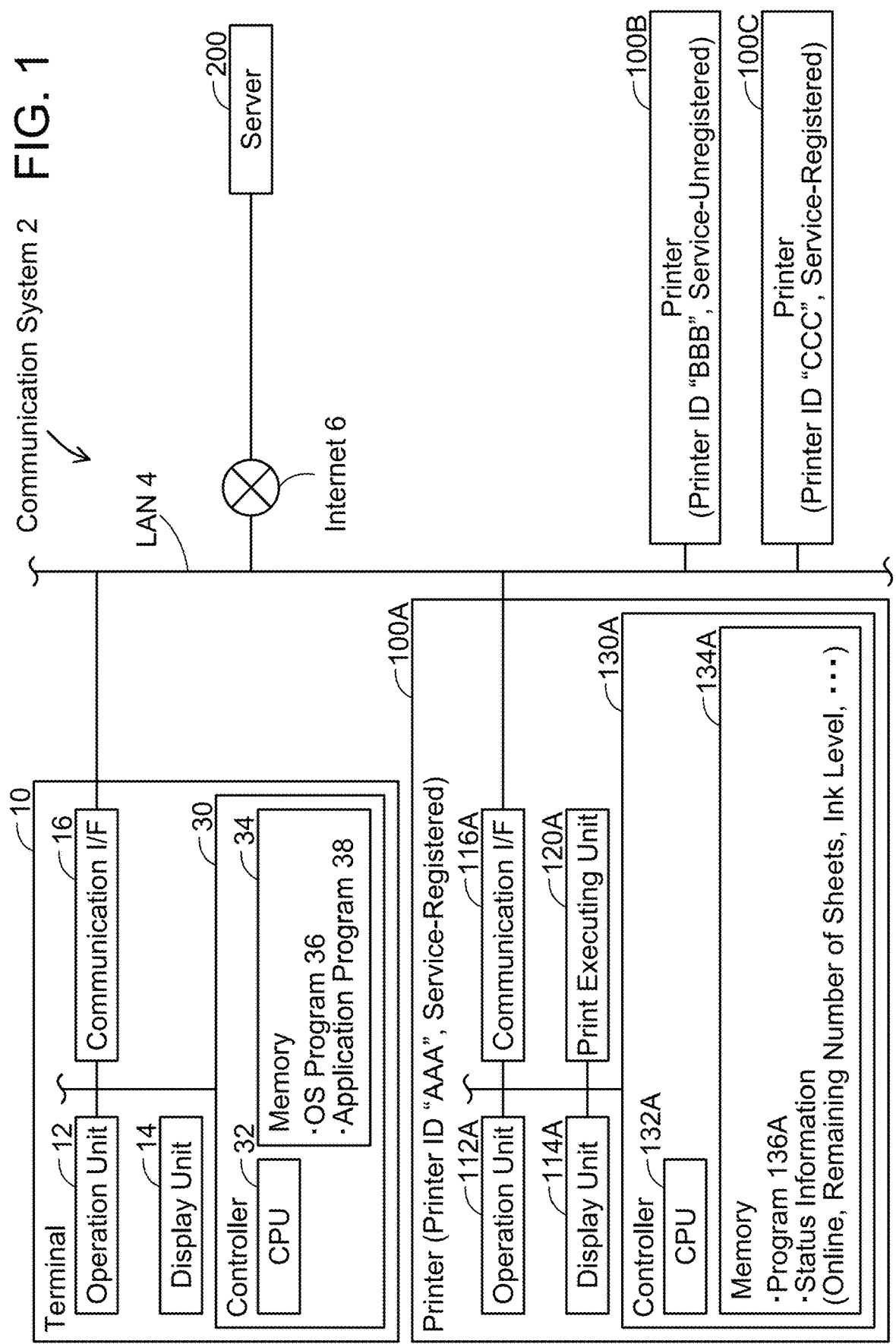
FIG. 1 illustrates a configuration of a communication system 2.

Configuration of Communication System 2; FIG. 1

As shown in FIG. 1, a communication system 2 comprises a terminal 10, three printers 100A to 100C, and a server 200. The terminal 10 and the respective printers 100A to 100C are connected to a Local Area Network (LAN) 4. The terminal 10 and the printers 100A to 100C are configured to communicate with each other via the LAN 4. The LAN 4 may be a wired LAN or a wireless LAN.

The server 200 is connected to the LAN 4 via the Internet 6. The terminal 10 and each of the printers 100A to 100C is configured to communicate with the server 200 via the LAN 4 and the Internet 6. Here, the server 200 may be realized by a single server or by a plurality of servers cooperating. The server 200 may be a physical one or a virtual one. The server 200 may not be arranged on the Internet 6 but may be arranged in the LAN 4.

Configuration of Server 200

The server 200 provides a fixed-rate printing service. The fixed-rate printing service provides printing on a predetermined number or less of print medium (e.g., 200 sheets or less of paper) for every predetermined duration (e.g., one month) at a fixed rate.

The fixed-rate printing service uses color cartridges dedicated for the printing service. Hereafter, these cartridges will be referred to as "dedicated cartridges". The server 200 manages remaining level(s) of color material(s) (e.g., ink, toner) in the dedicated cartridge mounted in a printer for which registration of the fixed-rate printing service has been completed. When a color material in a dedicated cartridge becomes scarce, the server 200 executes a process for shipping a new dedicated cartridge to a user of the printer. As such, in the fixed-rate printing service, as long as the number of the consumed printing medium does not exceed the predetermined number, the service cost is fixed no matter how much color material is consumed.

Configuration of Terminal 10

The terminal 10 is a mobile terminal device such as a cell phone, a smartphone, a PDA, a tablet PC, etc. In a modification, the terminal 10 may be a stationary PC, a laptop PC, for example. The terminal 10 comprises an operation unit 12, a display unit 14, a communication interface 16, and a controller 30. Each of the units 12 to 30 is connected to a bus line. Hereafter, the interface will be referred to as "I/F".

The operation unit 12 is an I/F which enables a user to input various information to the terminal 10, and for example may comprise a touchscreen and/or button(s). The display unit 14 is a display configured to display various types of information. The communication I/F 16 comprises a LAN I/F and a Bluetooth I/F. The LAN I/F is an I/F for connecting to a LAN (e.g., the LAN 4) and the Bluetooth I/F is an I/F for sending and receiving a signal according to Bluetooth standards. Bluetooth is a registered trademark of Bluetooth SIG.

The controller 30 comprises a CPU 32 and a memory 34. The memory 34 stores an OS program 36 and an application program 38. The CPU 32 is configured to execute various processes in accordance with the OS program 36 and the application program 38 stored in the memory 34. The memory 34 may comprise for example a ROM, RAM. Hereafter, an OS program will be referred to as "OS". Here, an application program will be referred to as "app".

The OS 36 is configured to control basic operations of the terminal 10. The app 38 causes each of the printers 100A to 100C to execute printing. The app 38 is a so-called native application which is downloaded from a server on the Internet 6 provided for example by a vendor of the printers 100A to 100C and then installed on the terminal 10. In a modification, the app 38 may not be a native application, but may be a web application for example, may be a cloud application, or may be an application realized by a combination of at least two of the native application, the web application, and the cloud application. Here, the "combination of at least two" means a combination of the native application and the web application (so-called hybrid application), a combination of the native application and the cloud application, the combination of the web application and the cloud application, or the combination of the native application, the web application, and the cloud application.

Configuration of Printer 100A

The printer 100A is a peripheral device configured to execute a print function, and for example, is a peripheral device of the terminal 10. In a modification, the printer 100A may be a multi-function peripheral configured to execute a scan function, a facsimile function, in addition to the print function. The printer 100 has a printer ID "AAA". The printer 100A is a registered printer. The "registered printer" means a printer for which the registration of the fixed-rate printing service has been completed. The "registration of the fixed-rate printing service has been completed" means that necessary information required for receiving the fixed-rate printing service is registered in the server 200. The information herein may comprise for example identification information of the printer 100A (e.g., printer ID "AAA") and user information (e.g., a name, an address, credit card data) of the printer 100A.

The printer 100A comprises an operation unit 112A, a display unit 114A, a communication I/F 116A, a print executing unit 120A, and a controller 130A. Each of the units 112A to 130A is connected to a bus line.

The operation unit 112A is an I/F configured to enable a user to input various information to the printer 100A, and may for example comprise a touchscreen and/or button(s). The display unit 114A is a display configured to display various information. The communication I/F 116A comprises a LAN I/F and Bluetooth I/F. The print executing unit 120A comprises an ink-jet printing mechanism. In a modification, the print executing unit 120A may comprise a printing mechanism different from the ink-jet scheme, for example, a laser scheme printing mechanism, and a thermal printing mechanism.

The controller 130A comprises a CPU 132A and a memory 134A. The CPU 132A is configured to execute various processes in accordance with a program 136A stored in the memory 134A. The memory 134A may for example comprise a ROM, RAM. The memory 134A further stores a printer ID "AAA" and information indicative of being a registered printer, and status information. The status information includes information indicating a communication status with the server 200. This information indicates either of "online" indicative of being able to communicate with the server 200 or "offline" indicative of being unable to communicate with the server 200. A status where the information indicating the communication status with the server 200 indicates "offline" happens when for example the server 200 is down, when a communication failure is occurring on the Internet 6, and/or when a communication failure is occurring between the LAN 4 and the Internet 6. When the printer 100A cannot communicate with the server 200 for a predetermined duration or longer (e.g., when communication from the server 200 cannot be received for a predetermined duration or longer, and/or when a response cannot be received even a predetermined duration has lapsed since the printer 100A sent a signal to the server 200) in a situation where the information indicative of the communication status with the server 200 indicates "online", the printer 100A updates this information from "online" to "offline". Here, in the present embodiment, in the situation where the information indicating the communication status with the server 200 indicates "offline", the printing in the registered printer is limited (e.g., printing is permitted only on a small number of print medium). The status information further includes information indicating a remaining number of sheets of print medium (hereafter, "remaining number of sheets") which the printer 100A can print at the fixed rate within a predetermined duration. Here, the status information may include, instead of the remaining number of sheets, information indicating a total number of print medium which the printer 100A printed using the fixed-rate printing service within the predetermined duration. The status information further includes information indicating ink remaining level(s) in the dedicated cartridge(s) mounted in the printer 100A.

Configuration of Printer 100B

A printer 100B has a same configuration as that of the printer 100A except that the printer 100B stores a printer ID "BBB" and the printer 100B is an unregistered printer for which the registration of the fixed-rate printing service has not been completed. That is, the memory of the printer 100B stores information indicative of being an unregistered printer. Since the printer 100B is the unregistered printer in particular, the status information stored in the printer 100B does not comprise information related to the service (i.e., communication status with the server 200 and remaining number of sheets).

Configuration of Printer 100C

A printer 100C has a same configuration as that of the printer 100A except that the printer 100C stores a printer ID "CCC". The printer 100C is a registered printer.

Figure 2:
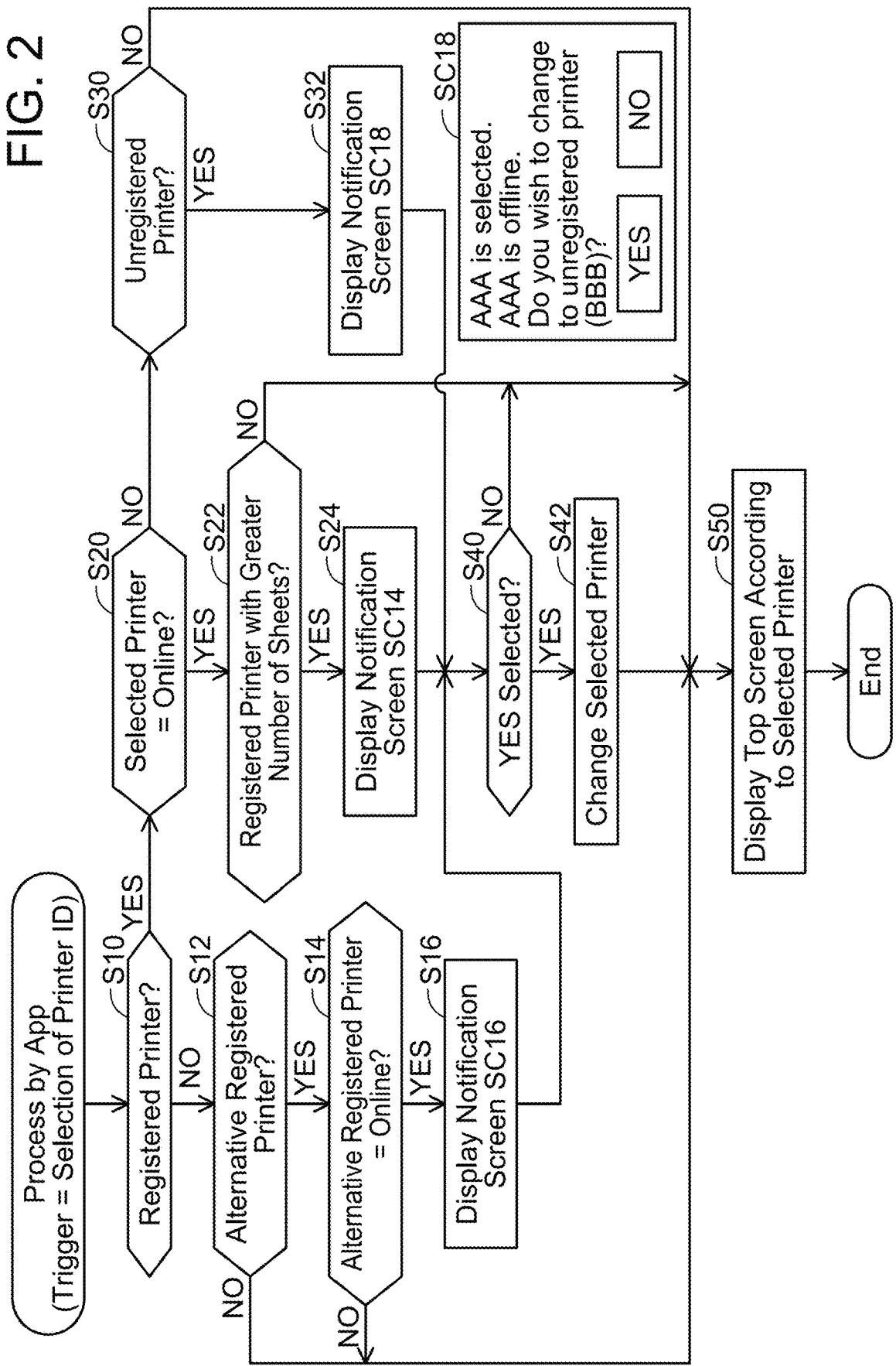
FIG. 2 is a flowchart of process performed by an app.

Processes by App 38; FIG. 2

Subsequently, with reference to FIG. 2, process realized by the CPU 32 executing the app 38 will be described. The process of FIG. 2 is initiated when selection of one printer ID is accepted via a printer selection screen (see S12 in FIG. 3) from a user. Hereafter, the printer ID selected by the user will be referred to as "selected printer ID". Further, the printer with the selected printer ID" will be referred to as "selected printer".

At an initial state where the process of FIG. 2 is initiated, the app 38 has the status information of each of the printers 100A to 100C in the LAN 4 stored therein. The status information of each of the printers 100A to 100C may comprise information which the app 38 received from each of the printers 100A to 100C in the past, or may comprise the latest information. Such latest information is received from each of the printers 100A to 100C by the app 38 sending a signal requesting for sending of the status information to each of the printers 100A to 100C when the app 38 is activated, for example.

The CPU 32 determines whether the selected printer is the registered printer or not in S10. Specifically, the CPU 32 determines YES to S10 when the status information of the selected printer includes the information indicating the communication status with the server 200, and proceeds to S20. Contrary to this, the CPU 32 determines NO to S10 when the status information of the selected printer does not include the information indicating the communication status with the server 200 and proceeds to S12.

In S12, the CPU 32 determines whether alternative registered printer(s) are present in the LAN 4. Specifically, the CPU 32 specifies status information of printer(s) different from the selected printer. Then the CPU 32 specifies the above-mentioned different printer(s) as the alternative registered printer(s) when the specified status information includes the information indicating the communication status with the server 200. Contrary to this, the CPU 32 performs the same process using the other status information when the specified status information does not include the information indicating the communication status with the server 200. The CPU 32 determines YES to S12 when the CPU 32 specifies one or more of alternative registered printers and then proceeds to S14. The CPU 32 determines NO to S12 when the CPU 32 cannot specify any registered printer, and then proceeds to S50.

In S14, the CPU 32 determines whether each of the specified alternative registered printer(s) is online or not. Specifically, the CPU 32 specifies the information indicating the communication status with the server 200 from the status information of one of the alternative registered printer(s). When such information indicates "online", the CPU 32 specifies that the registered printer of the above status information is online. Contrary to this, when such information indicates "offline", the CPU 32 performs the same process using the status information of another alternative registered printer. When one or more registered printers being online are specified, the CPU 32 determines YES to S14 and proceeds to S16. Contrary to this, the CPU 32 determines NO when no registered printer being online can be specified in S14, and proceeds to S50.

In S16, the CPU 32 displays a notification screen SC16 (see FIG. 3) on the display unit 14. The notification screen SC16 includes a message notifying the user of an existence of the alternative registered printer(s), a message inquiring the user whether to change a default printer to an alternative registered printer, and YES and NO buttons. Accordingly, the user can select whether to change the default printer to an alternative registered printer or not after the user has selected the printer ID of the unregistered printer. Due to this, the default printer can be changed to an alternative registered printer for which the registration of the fixed-rate printing service has been completed.

In S20, the CPU 32 determines whether the selected printer is online or not. Specifically, the CPU 32 specifies the information indicating the communication status with the server 200 from the status information of the selected printer. The CPU 32 determines YES to S20 when such information indicates "online" and proceeds to S22. Contrary to this, the CPU 32 determines NO to S20 when such information indicates "offline" and proceeds to S30.

In S22, the CPU 32 determines whether registered printer (s) with a greater remaining number of sheets are present in the LAN 4 or not. Specifically, the CPU 32 firstly specifies the remaining number of sheets included in the status information of the selected printer. Next, the CPU 32 specifies the status information of a registered printer different from the selected printer. How the registered printer(s) are specified was described in S12. The CPU 32 specifies the remaining number of sheets included in the specified status information. The CPU 32 executes the same process for each of the registered printer(s). The CPU 32 determines NO to S22 when the remaining number of sheets included in the status information of the selected printer is greater than any of the other specified remaining number(s) of sheets, and proceeds to S50. Contrary to this, the CPU 32 determines YES to S22 when there are registered printer(s) with the remaining number of sheets greater than the remaining number of sheets included in the status information of the selected printer, and specifies the printer ID of one of those registered printer(s) and proceeds to S24.

In S24, the CPU 32 displays a notification screen SC14 (see FIG. 3) on the display unit 14. The notification screen SC14 includes a message prompting the user to change the default printer to an alternative registered printer with a greater remaining number of sheets than the selected printer instead of the selected printer and YES and NO buttons. Accordingly, the user can select whether to change the default printer to an alternative registered printer with a greater remaining number of sheets than the selected printer after the user has selected the printer ID of the registered printer. Due to this, the default printer can be changed to an alternative registered printer with a greater remaining number of sheets.

In S30, the CPU 32 determines whether unregistered printer(s) are present in the LAN 4. Specifically, the CPU 32 specifies the status information of printer(s) different from the selected printer. When the specified status information does not include the information indicating the communication status with the server 200, the CPU 32 specifies the above different printer(s) as unregistered printer(s). Contrary to this, when the specified status information includes the information indicating the communication status with the server 200, the CPU 32 executes the same process by using another status information. When one or more unregistered printers are specified, the CPU 32 determines YES to S30 and proceeds to S32. When no unregistered printer is specified, the CPU 32 determines NO to S30 and proceeds to S50.

In S32, the CPU 32 displays a notification screen SC18 on the display unit 14. The notification screen SC18 includes a message indicating that the selected printer is offline, a message inquiring the user whether to change the default printer to an unregistered printer, and YES and NO buttons. The user can change the default printer to an unregistered printer after the user has selected the registered printer being offline via the notification screen SC18.

In S40, the CPU 32 determines whether the YES button in the notification screen SC16, or SC14, or SC18 has been selected or not. The CPU 32 proceeds to S42 when the YES button in the notification screen has been selected (YES to S40), while the CPU 32 proceeds to S50 when the NO button in the notification screen has been selected (NO to S40).

The CPU 32 changes the selected printer in S42. Specifically, the CPU 32 changes the selected printer to one of the alternative registered printer(s) being online in S42 after S16. The CPU 32 changes the selected printer to one of the alternative registered printer(s) with a greater remaining number of sheets in S42 after S24. The CPU 32 changes the selected printer to one of the unregistered printer(s) in S42 after S32.

In S50, the CPU 32 displays a top screen depending on the selected printer (see SC10, or SC20, or SC30 of FIG. 3) on the display unit 14.

Figure 3:
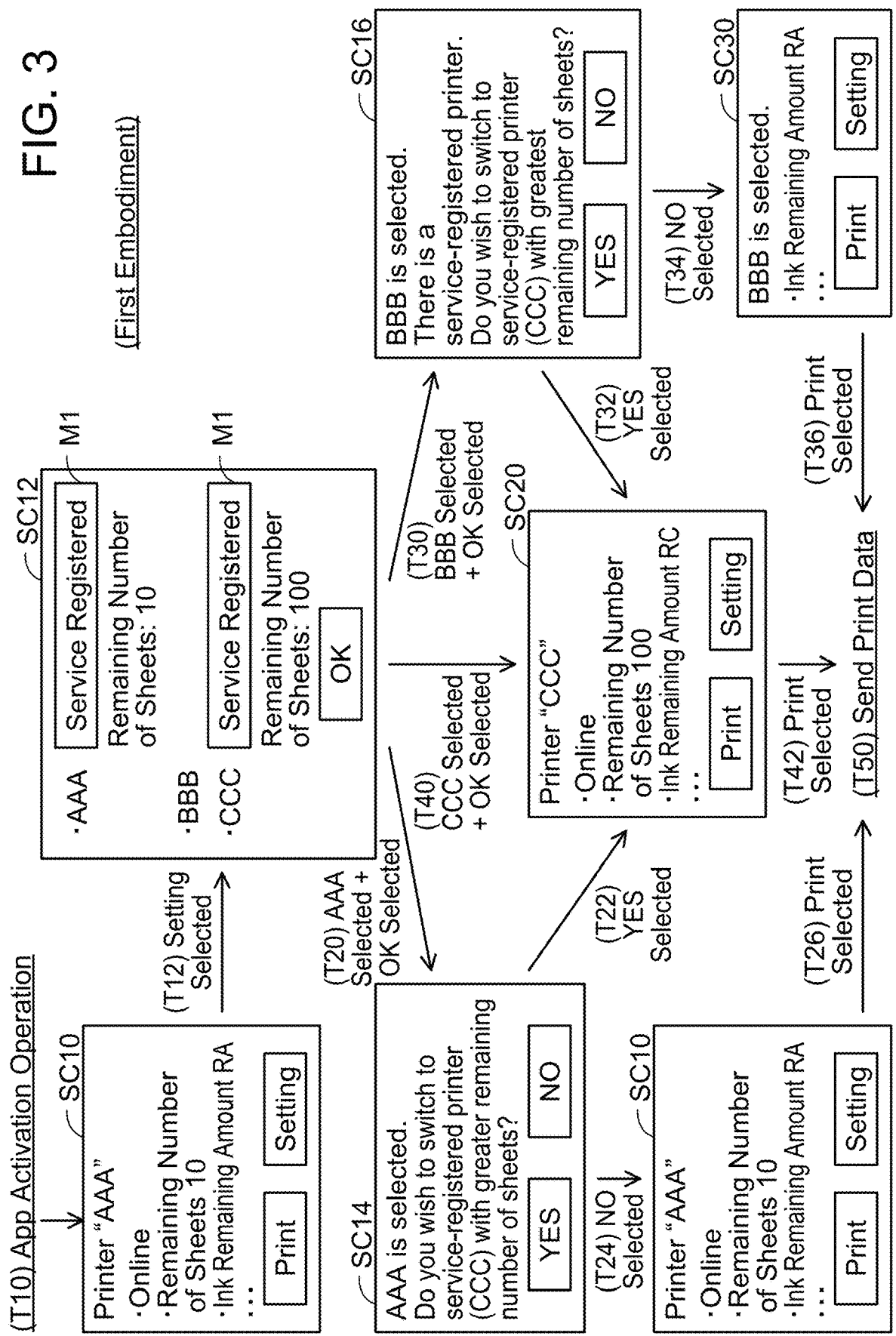
FIG. 3 illustrates how a screen displayed on a terminal device transitions.

Specific Cases; FIG. 3

Next, a specific case realized by process of FIG. 2 will be described with reference to FIG. 3. In an initial state of FIG. 3, the printers 100A, 100C, for which the registration of the service has been completed, are online. Hereafter, process executed by the CPU 32 of the terminal 10 will be described with the terminal 10 as a subject of action without describing the CPU 32 as a subject of action, for the sake of easier understanding. Further, process realized by the CPU 32 executing the app 38 among the process executed by the CPU 32 of the terminal 10 will be described with the app 38 as subject of action without describing the terminal 10 as subject of action. Further, although the app 38 executes the respective process by accessing the CPU 32, the memory 34, the display unit 14, the communication I/F 16, etc. via the OS 36, the description about the intervention of the OS 36 may be omitted when these processes are described.

The terminal 10 accepts an app activating operation for activating the app 38 from the user in T10. The app activating operation may comprise for example an operation of tapping an icon of the app 38. In this case, the app 38 displays the top screen SC10. The top screen SC10 includes the printer ID "AAA" of the default printer 100A which is to execute printing, the status information of the printer 100A, a "Print" button, and a "Setting" button. Here, the default printer is a printer which has been designated by the user in advance. The status information of the printer 100A included in the top screen SC10 may be information which the app 38 received from the printer 100A in the past, or may be latest information. Such latest information is received from the printer 100A by the app 38 sending a signal requesting for sending of the status information to the printer 100A when the app 38 is activated. Here, when the default printer has not been designated by the user in advance (e.g., when the app 38 is activated for the first time), the app 38 may display a top screen including only the above "Setting" button.

When the app 38 accepts selection of the Setting button in the top screen SC10 from the user in T12, the app 38 displays a printer selection screen SC12. The printer selection screen SC12 is a screen for selecting a printer which is to execute printing, and includes the printer IDs (i.e., "AAA" to "CCC") of the respective printers in the LAN 4 (i.e., the printers 100A to 100C) and an OK button. The app 38 generates the printer selection screen SC12 as described below.

When the app 38 accepts selection of the Setting button from the user in T12, the app 38 sends a search signal for searching for printer(s) to the LAN 4. When each of the printers 100A to 100C in the LAN 4 receives the search signal from the terminal 10, each of the printers 100A to 100C sends a search response including the printer ID of the printer itself and the status information to the terminal 10. In the present case, the app 38 receives three search responses. The app 38 specifies one of the three search responses and specifies the printer ID and the status information included in the one search response. Here, an example where the search response received from the printer 100A is specified will be described. The app 38 specifies the printer ID "AAA" and the status information included in the search response. Since the printer 100A is the registered printer, the status information includes the information indicating the communication status with the server 200 and the remaining number of sheets. When such specified status information includes these information, the app 38 determines the specified printer ID "AAA" as the printer ID of the registered printer, and places the printer ID "AAA" in a display manner including a mark M1 and the remaining number of sheets on the printer selection screen SC12. The mark M1 includes a character string indicative of being a registered printer. In a modification, the printer ID "AAA" may be placed in a display manner not including the remaining number of sheets, or may be placed in a display manner including the information indicating the communication status with the server 200 (i.e., "online" or "offline") in addition to the mark M1.

Next, the app 38 specifies another search response of the received three search responses and specifies the printer ID and the status information included in the one search response. Here, an example where the search response received from the printer 100B is specified will be described. The app 38 specifies the printer ID "BBB" and the status information included in the search response received from the printer 100B. Since the printer 100B is an unregistered printer, the status information includes neither the information indicating the communication status with the server 200 nor the remaining number of sheets. When the specified status information does not include these information, the app 38 determines the specified printer ID "BBB" as the printer ID of the unregistered printer, and displays the printer ID "BBB" in a display manner not including the mark M1 on the printer selection screen SC12. The printer ID "BBB" is placed directly below the printer ID "AAA" which was placed in the immediately before process. Since the specified status information does not include the remaining number of sheets, the printer ID "BBB" is placed in the display manner not including the remaining number of sheets.

Next, the app 38 specifies the remaining one search response of the received three search responses (i.e., search response received from the printer 100C) and specifies the printer ID "CCC" and the status information included in this search response. Since the printer 100C is the registered printer, the app 38 places the printer ID "CCC" in the display manner including the mark M1 and the remaining number of sheets on the printer selection screen SC12. The printer ID "CCC" is placed directly below the printer ID "BBB" which was placed in the immediate previous process.

The printer selection screen SC12 is generated as mentioned above. In a modification, the app 38 may be configured to periodically receive the status information from each of the printers 100A to 100C. In this case, when the Setting button included in the top screen SC10 is selected, the app 38 may use the status information which was received from each of the printers 100A to 100C in the past without sending the search signal to the LAN 4 and then may generate the printer selection screen SC12.

In another modification, the app 38 may receive the status information from each of the printers 100A to 100C, instead of by using the LAN 4, using a signal according to the Bluetooth standards via the Bluetooth I/F.

As such, in the printer selection screen SC12, each of the printer IDs "AAA", "CCC" of the registered printers 100A, 100C has a display manner including the mark M1. Contrary to this, the printer ID "BBB" of the unregistered printer 100B has the display manner not including a mark. That is, in the printer selection screen SC12, the respective printer IDs "AAA", "CCC" of the registered printers 100A, 100C are displayed with priority over the printer ID "BBB" of the unregistered printer 100B. Due to this, the user can easily recognize each of the registered printers 100A, 100C. Accordingly, user convenience is improved. Since each of the printer IDs "AAA", "CCC" is also associated with the remaining number of sheets in particular, the user can easily recognize the remaining numbers of sheets of the respective registered printers 100A and 100C.

Next, cases where each of the IDs "AAA", "BBB", "CCC" is selected in the printer selection screen SC12 is selected will be described. Firstly, the case where the printer ID "AAA" of the registered printer 100A is selected in the printer selection screen SC12 will be described.

After the app 38 accepts selection of the printer ID "AAA" in T20, the app 38 accepts selection of the OK button (trigger for FIG. 2). In this case, because the printer 100A is a registered printer (YES to S10) and also the printer 100A is online (YES to S20), the app 38 determines whether there is any other registered printer with a greater remaining number of sheets than that of the registered printer 100A (S22). Since in the present case the remaining number of sheets of the registered printer 100C is greater than the remaining number of sheets of the registered printer 100A (YES to S22), the app 38 displays the notification screen SC14 (S24). Here, when there is no other registered printer with a greater remaining number of sheets than that of the registered printer 100A (NO to S22), the app 38 displays the top screen SC10 again (S50) without displaying the notification screen SC14.

When the app 38 accepts selection of the YES button in the notification screen SC14 in T22 (YES to S40) from the user, the app 38 changes the default printer from the printer 100A to the printer 100C (S42), and displays a top screen SC20 (S50). The top screen SC20 includes the printer ID "CCC" as the printer ID of a printer which is to execute printing (i.e., default printer) and also includes the status information of the printer 100C. The rest is the same as the top screen SC10.

The app 38 accepts the selection of the Print button in the top screen SC20 from the user in T42. In this case, although this is not shown, the app 38 displays a screen for selecting an image to be printed and accepts the selection of the image to be printed from the user. Then the app 38 converts the image to be printed to generate print data having a data format interpretable by the printer 100C and sends the print data to the printer 100C via the communication I/F 16 in T50. As a result of this, the image to be printed is printed by the printer 100C.

When the app 38 accepts selection of the NO button in the notification screen SC14 from the user in T24 (NO to S40), the app 38 displays the top screen SC10 again with the default printer maintained as the printer 100A.

When the app 38 accepts the selection of the Print button in the top screen SC10 and the selection of the image to be printed from the user in T26, the app 38 sends the print data representing the image to be printed to the printer 100A via the communication I/F 16 in T50. As a result of this, the image to be printed is printed by the printer 100A.

Next, the case where the printer ID "BBB" of the unregistered printer 100B is selected in the printer selection screen SC12 will be described. The app 38 accepts the selection of the OK button (trigger for FIG. 2) in T30 after the app 38 has accepted the selection of the printer ID "BBB". In this case, because the printer 100B is the unregistered printer (NO to S10), the app 38 determines whether there is any registered printer in the LAN 4 (S12). Since in the present case there are the registered printers 100A, 100C being online (YES to S12, YES to S14), the app 38 displays the notification screen SC16 (S16). In the present embodiment, the app 38 specifies the printer 100C with the greatest remaining number of sheets among the printers 100A, 100C and displays the notification screen SC16 for inquiring whether to change the default printer to the specified printer 100C. In a modification, when two or more alternative registered printers being online are specified in S14 of FIG. 2, the app 38 may determine one printer from among the specified alternative registered printers, display a notification screen for inquiring whether to change the default printer to that registered printer. When there is no registered printer present in the LAN 4 (NO to S12) or when any of the registered printer(s) present in the LAN 4 is offline (NO to S14), the app 38 displays a top screen SC30 (S50) to be described later without displaying the notification screen SC16.

When the app 38 accepts selection of the YES button in the notification screen SC16 from the user in T32 (YES to S40), the app 38 displays the top screen SC20 (S42, S50). Processes from here are as mentioned already.

When the app accepts selection of the NO button in the notification screen SC16 from the user in T34 (NO to S40), the app 38 changes the default printer from the printer 100A to the printer 100B and displays the top screen SC30 (S50). The top screen SC30 includes the printer ID "BBB" as the printer ID of the printer to execute printing (i.e., default printer) and also includes the status information of the printer 100B. The rest is the same as that of the top screen SC10.

When the app 38 accepts selection of the Print button in the top screen SC30 and selection of an image to be printed from the user in T36, the app 38 sends print data representing the image to be printed to the printer 100B via the communication I/F 16 in T50. As a result of this, the image to be printed is printed by the printer 100B.

Lastly, the case where the printer ID "CCC" is selected on the printer selection screen SC12 will be described. After the app 38 has accepted selection of the printer ID "CCC" in the printer selection screen SC12 in T40, the app 38 accepts selection of the OK button (trigger for FIG. 2). In this case, because the printer 100C is the registered printer (YES to S10) and also the printer 100C is online (YES to S20), the app 38 determines whether there is any other registered printer having a greater remaining number of sheets than the registered printer 100C (S22). In the present case, there is no other registered printer having a greater remaining number of sheets than the registered printer 100C (NO to S22). In this case, the app 38 changes the default printer from the printer 100A to the printer 100C and displays the top screen SC20 (S50). Process hereafter is the same as mentioned already. When the printer ID "CCC" of the printer 100C having the greatest remaining number of sheets is selected as such, no notification screen is displayed. This is because there is no need to prompt the user to cause another printer to execute printing. Since no unnecessary screens are displayed, user convenience is improved.

Correspondence Relationship

The terminal 10 is an example of "terminal device". The printers 100A, 100C are examples of "M printing devices". The printer 100B is an example of "N printing devices". In particular, the printer 100A, the printer 100C, the printer 100B are respectively examples of "first printing device", "second (and fourth) printing device", "third printing device". The printer IDs "AAA" and "CCC" are examples of "M pieces of identification information". The printer ID "BBB" is an example of "N pieces of identification information". In particular, the printer IDs "AAA", "CCC", and "BBB" are examples of "first identification information", "second (and fourth) identification information", "third identification information". The fixed-rate printing service is an example of "predetermined service". The print medium is an example of "consumables". The display manner including the mark M1 is an example of "first display manner". The display manner not including the mark M1 is an example of "second display manner". The printer selection screen SC12 is an example of "selection screen". The notification screen SC14, the notification screen SC16 are examples of "first notification screen", "second notification screen". The remaining number of sheets is an example of "difference".

The process of displaying the printer selection screen SC12 of FIG. 3 is an example of process by "display a selection screen on a display unit of the terminal device". The process of S24 in FIG. 2 and the process of displaying the notification screen SC14 of FIG. 3 are examples of process by "display a first notification screen on the display unit". The process of S16 in FIG. 2 and the process of displaying the notification screen SC16 in FIG. 3 are examples of process by "display a second notification screen on the display unit". The process of T50 in FIG. 2 is an example of process by "send a print executing instruction".

Second Embodiment; FIG. 4

Next, a second embodiment will be described with reference to FIG. 4. In the second embodiment, the printer selection screen SC112 is displayed instead of the printer selection screen SC12. The printer selection screen SC112 differs in arranged positions of the respective printer IDs from that of the first embodiment. A method of generating the printer selection screen SC112 is as follows.

The app 38 uses each status information received from the respective printers 100A to 100C in the LAN 4 to group the printer IDs included in the respective status information into the printer ID(s) of the registered printer(s) and the printer ID(s) of the unregistered printer(s). The app 38 places the registered printer ID(s) above the unregistered printer ID(s). In the present case, the app 38 places the respective printer IDs "AAA", "CCC" above the printer ID "BBB". Due to this, the user can easily recognize the printer IDs "AAA" "CCC" of the registered printers 100A, 100C.

When there are two or more registered printers, the app 38 places a printer ID of a registered printer with a greater remaining number of sheets at a higher level. In the present case, because the remaining number of sheets "100" of the registered printer 100C is greater than the remaining number of sheets "10" of the registered printer 100A, the app 38 places the printer ID "CCC" of the registered printer 100C above the printer ID "AAA" of the registered printer 100A. Due to this, the user is able to easily recognize the printer 100C with a greater remaining number of sheets.

The app 38 may determine which printer ID to be placed at a higher level in accordance with a rule predetermined by a manager instead of placing the printer ID of the registered printer with a greater remaining number of sheets at a higher level. For example, the printer ID of a printer which the manager wishes the user to use may be placed at a higher level. Due to this, the user can easily recognize a printer which he/she should cause to execute printing.

Third Embodiment; FIG. 4

Next, a third embodiment will be described with reference to FIG. 4. In the third embodiment, the printer selection screen SC212 is displayed instead of the printer selection screen SC12. The printer selection screen SC212 differs from that of the first embodiment in that it does not include the printer ID of an unregistered printer. A method of generating the printer selection screen SC212 is as follows.

In the same way as the second embodiment, the app 38 groups the respective printer IDs into the printer ID(s) of the registered printer(s) and the printer ID(s) of the unregistered printer(s). Then the app 38 places the respective printer IDs "AAA", "CCC" of the registered printers 100A, 100C and does not place the printer ID "BBB" of the unregistered printer 100B. Accordingly, the app 38 may also be regarded as not displaying the printer ID "BBB". That is, on the printer selection screen SC212, the printer IDs "AAA", "CCC" of the registered printers 100A, 100C are displayed with priority over the printer ID "BBB" of the unregistered printer 100B. With such configuration also, the user can easily recognize the printer IDs "AAA", "CCC" of the registered printers 100A, 100C.

Fourth Embodiment; FIG. 4

Next, a fourth embodiment will be described with reference to FIG. 4. In the fourth embodiment, the printer selection screen SC312 is displayed instead of the printer selection screen SC12. The printer selection screen SC312 differs from the first embodiment in that a background color of the printer ID(s) of the registered printer(s) is changed. A method of generating the printer selection screen SC312 is as follows.

Similar to the second embodiment, the app 38 groups the respective printer IDs into the printer ID(s) of the registered printer(s) and the printer ID(s) of the unregistered printer(s). The app 38 implements a different color from a background color of the printer selection screen SC312 for a background color of the printer IDs "AAA", "CCC" of the registered printers 100A, 100C. A background color of the printer ID "BBB" of the unregistered printer 100B is the same as the background color of the printer selection screen SC312. In a modification, the background color of the printer ID "BBB" of the unregistered printer 100B may be white or gray for example and the printer IDs "AAA", "CCC" may be highlighted by making the background color of the printer IDs "AAA", "CCC" of the registered printers 100A, 100C yellow or red for example which is brighter and stands out more than the background color of the printer ID "BBB" of the unregistered printer 100B. That is, on the printer selection screen SC312, the printer IDs "AAA", "CCC" of the registered printers 100A, 100C are displayed with priority over the printer ID "BBB" of the unregistered printer 100B. Further, on the printer selection screen SC312, the printer IDs "AAA", "CCC" of the registered printers 100A, 100C may be regarded as being displayed in an intensified way relative to the printer ID "BBB" of the unregistered printer 100B. With such configuration also, the user can easily recognize the printer IDs "AAA", "CCC" of the registered printers 100A, 100C.

In a modification, the app 38 may use a different character color of the printer IDs "AAA", "CCC" of the registered printers 100A, 100C other than a character color of the printer ID "BBB" of the unregistered printer 100B, instead of changing the background color. In the present modification also, the user can easily recognize the printer IDs "AAA", "CCC" of the registered printers 100A, 100C.

Fifth Embodiment; FIG. 4

Next, a fifth embodiment will be described with reference to FIG. 4. In the fifth embodiment, a printer selection screen SC412 is displayed instead of the printer selection screen SC12. The printer selection screen SC412 differs from the first embodiment in that the printer ID(s) of the registered printer(s) are surrounded by an enclosure. A method of generating the selection screen S412 is as follows.

Similar to the second embodiment, the app 38 groups the respective printer IDs into the printer ID(s) of the registered printer(s) and the printer ID(s) of the unregistered printer(s). The app 38 surrounds each of the printer IDs "AAA", "CCC" of the registered printers 100A, 100C with an enclosure. The app 38 does not surround the printer ID "BBB" of the unregistered printer 100B with an enclosure. That is, on the printer selection screen SC412, the printer IDs "AAA", "CCC" of the registered printers 100A, 100C are displayed with priority over the printer ID "BBB" of the unregistered printer 100B. Further, on the printer selection screen SC412, the printer IDs "AAA", "CCC" of the registered printers 100A, 100C may be regarded as being displayed in an intensified way relative to the printer ID "BBB" of the unregistered printer 100B. With such configuration also, the user can easily recognize the printer IDs "AAA", "CCC" of the registered printers 100A, 100C.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The art described above may be implemented for a service different from the fixed-rate printing service. For example, a prepaid printing service may be implemented instead of the fixed-rate printing service. In the prepaid service, a user pays a certain fee before using a printer. The user can print by using the printer on a certain number of print medium according to the paid fee. When the printed number exceeds the certain number, surcharge will be incurred depending on the excess number. In the present modification, the prepaid service is an example of "predetermined service". In another modification, instead of a charged service (i.e., fixed-rate printing service, prepaid service) depending on a number of print medium, a charged service depending on consumed quantity of color material (e.g., ink) may be implemented. In the present modification, the color material is an example of "consumables". In yet another modification, the "predetermined service" may not be a service which charges the user a fee, but may be a print management service in which the server 200 manages print history in a printer (e.g., printer 100A). In general terms, the "predetermined service" simply needs to be a service related to printing.

(Modification 2) The mark M1 may not be the character string indicative of being a registered printer, but may be a logo mark indicative of the fixed-rate printing service.

(Modification 3) When the app 38 accepts the selection of the OK button after the printer ID "AAA" being selected in T20 in FIG. 3, the app 38 may display the top screen SC10 again without displaying the notification screen SC14. In the present modification, "display a first notification screen on the display unit" may be omitted.

(Modification 4) When the app 38 accepts the selection of the OK button after the printer ID "BBB" being selected in T30 in FIG. 3, the app 38 may display the top screen SC30 without displaying the notification screen SC16. In the present modification, "display a second notification screen on the display unit" may be omitted.

(Modification 5) When the process of T30 in FIG. 3 is executed, the app 38 may not specify the printer 100C with the greatest remaining number of sheets among the printers 100A, 100C. In this case, the app 38 may display a screen for inquiring the user whether to cause one of the two registered printers 100A, 100C instead of the printer 100B to execute printing instead of displaying the notification screen SC16. When the user selects to cause the registered printer 100A to execute printing, the app 38 may display the top screen SC10 while when the user selects to cause the registered printer 100C to execute printing, the app 38 may display the top screen SC20.

(Modification 6) In each of the above embodiments, when the OK button in the printer selection screen SC12 is selected, the notification screen SC14, SC16 is displayed. Alternatively, when the Print button is selected on the top screen SC10, the app 38 may display the notification screen SC14. Similarly, when the Print button is selected by the user on the top screen SC30, the app 38 may display the notification screen SC16. In another modification, the app 38 may display the notification screen SC14 by superposing the same on the top screen SC10 (e.g., by a pop-up). Similarly, the app 38 may display the notification screen SC16 by superposing the same on the top screen SC30.

(Modification 7) The printer selection screen SC12 may further include a Filter button, a Sort button, for example. When the Filter button is selected by the user, the app 38 may display a selection screen which includes the printer ID(s) of the registered printer(s) but does not include the printer ID of an unregistered printer (see the printer selection screen SC212 in FIG. 4). Further, when the Sort button is selected by the user, the app 38 may sort the printer IDs so that the printer ID of the registered printer with a greater remaining number of sheets is located at a higher level (see S112 in FIG. 4).

(Modification 8) While the information indicating the communication status with the server 200 indicates "offline", the printing at the registered printer may be prohibited. In this case, when the NO button in the notification screen SC18 is selected (NO to S18, S40 in FIG. 2), the app 38 may display a screen including a message indicating that as the selected printer which is a registered printer is offline, the selected printer is not available.

(Modification 9) Although the respective process in FIGS. 2, 3 are realized by software (e.g., OS 36, app 38) in each of the above embodiments, at least one of these processes may be realized by hardware such as logic circuit.

What is claimed is:

1. A non-transitory computer-readable recording medium storing computer-readable instructions for a terminal device,
wherein the computer-readable instructions, when executed by a processor of the terminal device, cause the terminal device to:
display a selection screen on a display unit of the terminal device, the selection screen being for selecting target identification information from among one or more pieces of identification information for identifying one or more printing devices, and the target identification information being for identifying a target printing device which is to execute printing; and
in a case where the target identification information is selected via the selection screen, send a print executing instruction to the target printing device identified by the target identification information,
wherein the selection screen includes M pieces of identification information for identifying M printing devices of the one or more printing devices and N pieces of identification information for identifying N printing devices of the one or more printing devices, the M being an integer equal to or greater than 1, and the N being an integer equal to or greater than 1,
each of the M printing devices is a printing device for which registration of a predetermined service related to printing has been completed,
each of the N printing devices is a printing device for which registration of the predetermined service has not been completed,
each of the M pieces of identification information has a first display manner, and
each of the N pieces of identification information has a second display manner different from the first display manner.

2. The non-transitory computer-readable recording medium as in claim 1,
the first display manner is a manner including a mark indicating the predetermined service, and
the second display manner is a manner not including the mark.

3. The non-transitory computer-readable recording medium as in claim 1, wherein
the predetermined service is a service which permits printing using consumables equal to or less than a predetermined amount at a predetermined charge,
the M is an integer equal to or greater than 2,
in a case where a difference between a current usage amount of the consumables at a first printing device of the M printing devices and the predetermined amount is less than a difference between a current usage amount of the consumables at a second printing device of the M printing devices and the predetermined amount, second identification information for identifying the second printing device is located above first identification information for identifying the first printing device on the selection screen, and
in a case where the difference between the current usage amount of the consumables at the first printing device and the predetermined amount is greater than the difference between the current usage amount of the consumables at the second printing device and the predetermined amount, the first identification information is located above the second identification information on the selection screen.

4. The non-transitory computer-readable recording medium as in claim 1, wherein
the predetermined service is a service which permits printing using consumables equal to or less than a predetermined amount at a predetermined charge,
wherein the computer-readable instructions, when executed by the processor, further cause the terminal device to:
in a case where first identification information for identifying a first printing device of the M printing devices is selected as the target identification information on the selection screen and a difference between a current usage amount of the consumables at the first printing device and the predetermined amount is less than a difference between a current usage amount of the consumables at a second printing device of the M printing devices and the predetermined amount, display a first notification screen on the display unit, the first notification screen being for prompting the user to select second identification information for identifying the second printing device as the target identification information instead of the first identification information, and
wherein in a case where the first identification information is selected as the target identification information on the selection screen and the difference between the current usage amount of the consumables at the first printing device and the predetermined amount is greater than the difference between the current usage amount of the consumables at the second printing device and the predetermined amount, the first notification screen is not displayed.

5. The non-transitory computer-readable recording medium as in claim 1, wherein the computer-readable instructions, when executed by the processor, further cause the terminal device to:

in a case where third identification information for identifying a third printing device of the N printing devices is selected as the target identification information on the selection screen, display a second notification screen on the display unit, the second notification screen being for prompting the user to select identification information for identifying one of the M printing devices as the target identification information instead of the third identification information, wherein in a case where fourth identification information for identifying a fourth printing device of the M printing devices is selected as the target identification information, the second notification screen is not displayed.

6. A non-transitory computer-readable recording medium storing computer-readable instructions for a terminal device, wherein the computer-readable instructions, when executed by a processor of the terminal device, cause the terminal device to:

display a selection screen on a display unit of the terminal device, the selection screen being for selecting target identification information from among one or more pieces of identification information for identifying one or more printing devices, and the target identification information being for identifying a target printing device which is to execute printing; and in a case where the target identification information is selected via the selection screen, send a print executing instruction to the target printing device identified by the target identification information, wherein on the selection screen, M pieces of identification information for identifying M printing devices of the one or more printing devices are displayed with priority over N pieces of identification information for identifying N printing devices of the one or more printing devices, the M being an integer equal to or greater than 1, and the N being an integer equal to or greater than 1, each of the M printing devices is a printing device for which registration of a predetermined service related to printing has been completed, and each of the N printing devices is a printing device for which registration of the predetermined service has not been completed.

7. The non-transitory computer-readable recording medium as in claim 6, wherein the selection information includes both the M pieces of identification information and the N pieces of identification information, each of the M pieces of identification information has a first display manner including a mark indicating the predetermined service, and each of the N pieces of identification information has a second display manner not including the mark.

8. The non-transitory computer-readable recording medium as in claim 6, wherein the selection screen includes both the M pieces of identification information and the N pieces of identification information, and the M pieces of identification information is located above the N pieces of identification information on the selection screen.

9. The non-transitory computer-readable recording medium as in claim 6, wherein the selection screen includes the M pieces of identification information but does not include the N pieces of identification information.

10. The non-transitory computer-readable recording medium as in claim 6, wherein the predetermined service is a service which permits printing using consumables equal to or less than a predetermined amount at a predetermined charge, the M is an integer equal to or greater than 2, in a case where a difference between a current usage amount of the consumables at a first printing device of the M printing devices and the predetermined amount is less than a difference between a current usage amount of the consumables at a second printing device of the M printing devices and the predetermined amount, second identification information for identifying the second printing device is located above first identification information for identifying the first printing device on the selection screen, and in a case where the difference between the current usage amount of the consumables at the first printing device and the predetermined amount is greater than the difference between the current usage amount of the consumables at the second printing device and the predetermined amount, the first identification information is located above the second identification information on the selection screen.

11. The non-transitory computer-readable recording medium as in claim 6, wherein the predetermined service is a service which permits printing using consumables equal to or less than a predetermined amount at a predetermined charge, wherein the computer-readable instructions, when executed by the processor, further cause the terminal device to:

in a case where first identification information for identifying a first printing device of the M printing devices is selected as the target identification information on the selection screen and a difference between a current usage amount of the consumables at the first printing device and the predetermined amount is less than a difference between a current usage amount of the consumables at a second printing device of the M printing devices and the predetermined amount, display a first notification screen on the display unit, the first notification screen being for prompting the user to select second identification information for identifying the second printing device as the target identification information instead of the first identification information, and wherein in a case where the first identification information is selected as the target identification information on the selection screen and the difference between the current usage amount of the consumables at the first printing device and the predetermined amount is greater than the difference between the current usage amount of the consumables at the second printing device and the predetermined amount, the first notification screen is not displayed.

12. The non-transitory computer-readable recording medium as in claim 6, wherein the computer-readable instructions, when executed by the processor, further cause the terminal device to:

in a case where third identification information for identifying a third printing device of the N printing devices is selected as the target identification information on the selection screen, display a second notification screen on the display unit, the second notification screen being for prompting the user to select identification information for identifying one of the M printing devices as the target identification information instead of the third identification information, wherein in a case where fourth identification information for identifying a fourth printing device of the M printing devices is selected as the target identification information, the second notification screen is not displayed.

13. A method for controlling a terminal device, the method comprising:

displaying a selection screen on a display unit of the terminal device, the selection screen being for selecting target identification information from among one or more pieces of identification information for identifying one or more printing devices, and the target identification information being for identifying a target printing device which is to execute printing; and in a case where the target identification information is selected via the selection screen, sending a print executing instruction to the target printing device identified by the target identification information, wherein the selection screen includes M pieces of identification information for identifying M printing devices of the one or more printing devices and N pieces of identification information for identifying N printing devices of the one or more printing devices, the M being an integer equal to or greater than 1, and the N being an integer equal to or greater than 1, each of the M printing devices is a printing device for which registration of a predetermined service related to printing has been completed, each of the N printing devices is a printing device for which registration of the predetermined service has not been completed, each of the M pieces of identification information has a first display manner, and each of the N pieces of identification information has a second display manner different from the first display manner.

14. The method as in claim 13, the first display manner is a manner including a mark indicating the predetermined service, and the second display manner is a manner not including the mark.

15. The method as in claim 13, wherein the predetermined service is a service which permits printing using consumables equal to or less than a predetermined amount at a predetermined charge, the M is an integer equal to or greater than 2, in a case where a difference between a current usage amount of the consumables at a first printing device of the M printing devices and the predetermined amount is less than a difference between a current usage amount of the consumables at a second printing device of the M printing devices and the predetermined amount, second identification information for identifying the second printing device is located above first identification information for identifying the first printing device on the selection screen, and in a case where the difference between the current usage amount of the consumables at the first printing device and the predetermined amount is greater than the difference between the current usage amount of the consumables at the second printing device and the predetermined amount, the first identification information is located above the second identification information on the selection screen.

16. The method as in claim 13, wherein the predetermined service is a service which permits printing using consumables equal to or less than a predetermined amount at a predetermined charge, the method further comprising:

in a case where first identification information for identifying a first printing device of the M printing devices is selected as the target identification information on the selection screen and a difference between a current usage amount of the consumables at the first printing device and the predetermined amount is less than a difference between a current usage amount of the consumables at a second printing device of the M printing devices and the predetermined amount, displaying a first notification screen on the display unit, the first notification screen being for prompting the user to select second identification information for identifying the second printing device as the target identification information instead of the first identification information, and wherein in a case where the first identification information is selected as the target identification information on the selection screen and the difference between the current usage amount of the consumables at the first printing device and the predetermined amount is greater than the difference between the current usage amount of the consumables at the second printing device and the predetermined amount, the first notification screen is not displayed.

17. A method for controlling a terminal device, the method comprising:

displaying a selection screen on a display unit of the terminal device, the selection screen being for selecting target identification information from among one or more pieces of identification information for identifying one or more printing devices, and the target identification information being for identifying a target printing device which is to execute printing; and in a case where the target identification information is selected via the selection screen, sending a print executing instruction to the target printing device identified by the target identification information, wherein on the selection screen, M pieces of identification information for identifying M printing devices of the one or more printing devices are displayed with priority over N pieces of identification information for identifying N printing devices of the one or more printing devices, the M being an integer equal to or greater than 1, and the N being an integer equal to or greater than 1, each of the M printing devices is a printing device for which registration of a predetermined service related to printing has been completed, and each of the N printing devices is a printing device for which registration of the predetermined service has not been completed.

18. The method as in claim 17, wherein the selection information includes both the M pieces of identification information and the N pieces of identification information, each of the M pieces of identification information has a first display manner including a mark indicating the predetermined service, and each of the N pieces of identification information has a second display manner not including the mark.

19. The method as in claim 17, wherein
the selection screen includes both the M pieces of identification information and the N pieces of identification information, and
the M pieces of identification information is located above the N pieces of identification information on the selection screen.

20. The method as in claim 17, wherein
the selection screen includes the M pieces of identification information but does not include the N pieces of identification information.

* * * * *